US011652962B2

(12) United States Patent
Vanden Bos et al.

(10) Patent No.: US 11,652,962 B2
(45) Date of Patent: May 16, 2023

(54) SYSTEM AND METHOD FOR MOVING AND ALIGNING TANDEM AXLE LOCK PINS ON A SEMI-TRAILER

(71) Applicant: Vanco Products, LLC, Marco Island, FL (US)

(72) Inventors: John Vanden Bos, Marco Island, FL (US); Nathan Colvin, Holland, MI (US); Matthew Colvin, Holland, MI (US); Steve Colvin, Holland, MI (US)

(73) Assignee: Vanco Products, LLC, Macro Island, FL (US)

( * ) Notice: Subject to any disclaimer, the term of this patent is extended or adjusted under 35 U.S.C. 154(b) by 208 days.

(21) Appl. No.: 17/231,563

(22) Filed: Apr. 15, 2021

(65) Prior Publication Data

US 2021/0329199 A1 Oct. 21, 2021

Related U.S. Application Data

(60) Provisional application No. 63/010,495, filed on Apr. 15, 2020.

(51) Int. Cl.
*H04N 7/18* (2006.01)
*H04W 4/48* (2018.01)
*B60D 1/36* (2006.01)
*B60R 11/04* (2006.01)
*B60R 11/00* (2006.01)

(52) U.S. Cl.
CPC ............ *H04N 7/185* (2013.01); *B60D 1/36* (2013.01); *B60R 11/04* (2013.01); *H04W 4/48* (2018.02); *B60R 2011/004* (2013.01); *B60R 2011/0057* (2013.01); *B60R 2011/0064* (2013.01)

(58) Field of Classification Search
CPC ........... H04N 7/185; H04W 4/48; B60D 1/36; B60R 11/04
USPC ....................................................... 348/148
See application file for complete search history.

(56) References Cited

U.S. PATENT DOCUMENTS

2014/0253909 A1* 9/2014 McClenahan ...... G01B 11/2755
356/139.09

* cited by examiner

*Primary Examiner* — Jeffery A Williams
(74) *Attorney, Agent, or Firm* — The Watson IP Group, PLC; Jovan N. Jovanovic

(57) ABSTRACT

A system and method for moving and aligning tandem axle lock pins on a semi-trailer, having a viewer and a remote receiver that are placeable in communication with each other. The viewer is attachable to a trailer so that a camera on the viewer can be positioned such that the trailer slide rail and tandem axle slider frame of a trailer are within the field of vision. The remote receiver may be a smartphone which can access data from the camera so that the user can from a remote location, such as a cab of a tractor, determine the alignment and orientation of the trailer slide rail and the tandem axle slider frame.

19 Claims, 3 Drawing Sheets

SYSTEM AND METHOD FOR MOVING AND ALIGNING TANDEM AXLE LOCK PINS ON A SEMI-TRAILER

CROSS-REFERENCE TO RELATED APPLICATION

This application claims priority to U.S. Patent Application Ser. No. 63/010,495, filed Apr. 15, 2020, entitled "SYSTEM AND METHOD FOR MOVING AND ALIGNING TANDEM AXLE LOCK PINS ON A SEMI-TRAILER", the entire specification of which is hereby incorporated by reference in its entirety.

BACKGROUND OF THE DISCLOSURE

1. Field of the Disclosure

The disclosure relates in general to driving aids, and more particularly, to a system and method for moving and aligning tandem axle lock pins on a semi-trailer.

2. Background Art

Semi-trailers and tractors are ubiquitous on the highways of this country and on highways across the world. These trailers are typically filled with goods that are transported both short and long distances. In many instances the trailers are loaded and unloaded multiple times each day with a different goods of different weights, dimensions, densities and other properties. Additionally, trailers may be loaded with varying goods, each of which has its own properties.

Due to the sheer variation in goods, the loading on a trailer (i.e., weight, cg, etc.) can be vastly different from load to load. To properly and safely drive the tractor-trailer, it is necessary to adjust the position of the trailer's tandem axle slider and wheels in response to the properties of the load that is being carried. To accomplish this, the trailers tandem axle slider rear axles can be shifted for or aft relative to the trailer, to match the correct position for the type and weight of load.

Problematically, such adjustment can be time consuming. The driver user first retracts the tandem axle lock unlocks pins at the rear of the trailer and then returns goes to the trailer tractor to move the trailer forward or backward. Using a best guess, the user driver moves the trailer then goes back to the trailer to see if further movement is necessary. In many instances, the driver has to go back and forth, in and out of the trailer tractor, multiple times. To speed up operations, multiple individuals may work on a single move, one driving the truck and one monitoring the position of the tandem axle and barking commands. Unfortunately, the communication is often quite poor due to noise and distance, and, the use of multiple individuals often leads to injury and death. In fact, the risk is quite high.

Some solutions have been provided that include proximity sensors, flags and position devices among others. Each solution, while aiding in some manner, is often difficult to set up and time consuming. And, in many instances, the solutions lack the accuracy to replace repeated movement by the driver in and out of the tractor cab to check on the position.

SUMMARY OF THE DRAWINGS

The disclosure is directed to a method of moving and aligning tandem axle lock pins on a semi-trailer. The method includes the steps of providing a viewer, the viewer comprising a housing having a bottom and a front, with a magnet positioned proximate the bottom and a camera extending from the front; attaching the magnet of the viewer to a trailer, so that a rail of the trailer is in the view of the camera, with the rail having openings; digitally coupling the camera with a remote receiver; moving the rail of the trailer relative to the tandem slider frame, the tandem slider frame having openings; aligning an opening of the openings of the rail with an opening of the openings of the tandem slider frame; viewing the camera through the remote receiver during the step of aligning; and locking the rail to the tandem slider frame.

In some configurations, the method further includes the steps of removing the viewer from the trailer.

Figure 1:
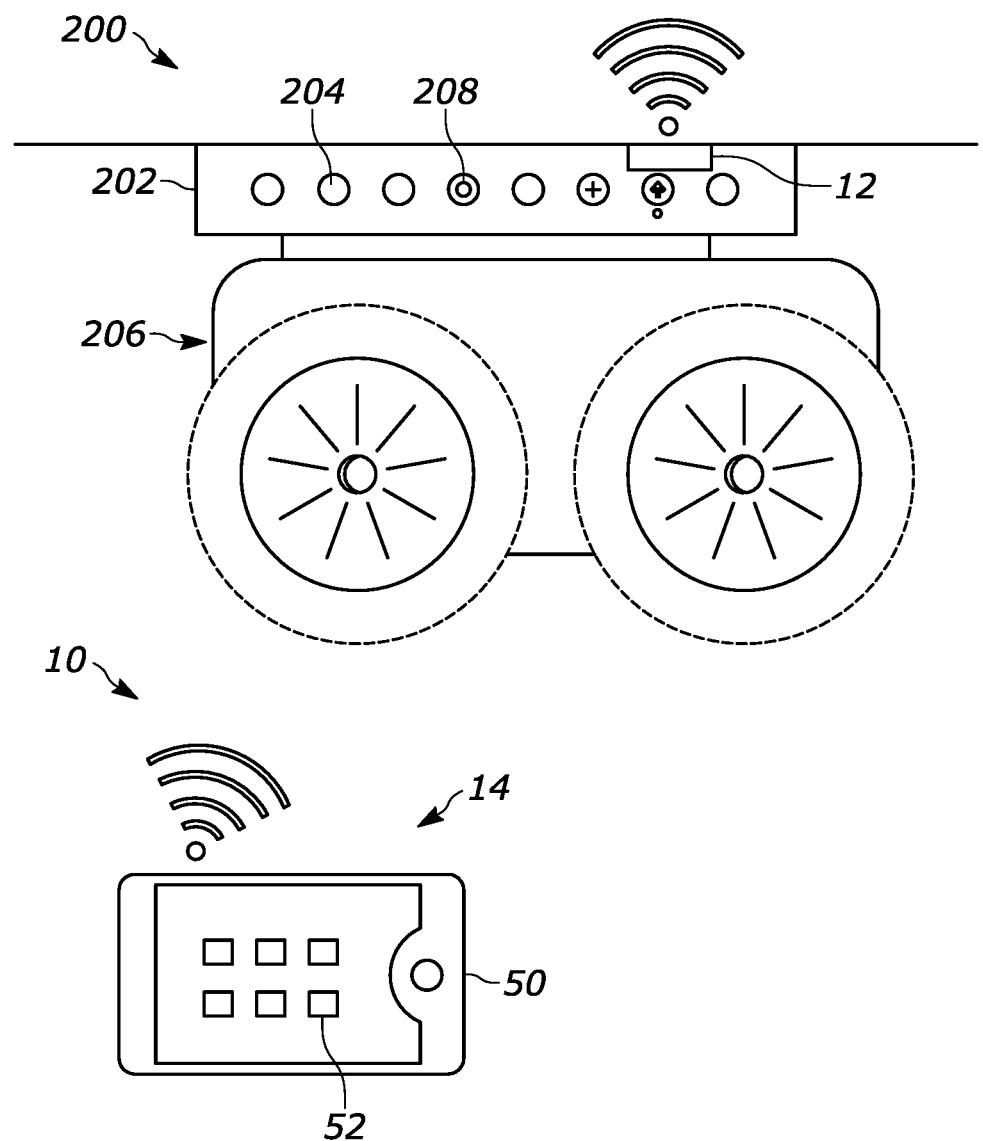

In some configurations, the step of digitally coupling further comprises the step of digitally coupling utilizing wifi.

In some configurations, the step of attaching further comprises the step of attaching the magnet of the viewer to a lower surface of a floor of the trailer.

In some configurations, the step of positioning the remote receiver within a cab of a tractor coupled to the trailer during the steps of moving and aligning.

In some configurations, the remote receiver comprises a smartphone.

In some configurations, the method further includes the step of associating an indicator with at least one of an opening of the openings of the rail, an opening of the openings of the tandem slider frame or a pin associated with at least one of the openings of the rail and the openings of the tandem slider frame.

In some configurations, the method includes the step of entering a cab of a tractor attachable to the trailer after the step of attaching; exiting the cab after the step of aligning; and returning to the cab of the tractor after the step of locking.

In some configurations, the steps of attaching, moving, aligning, viewing and locking are accomplished by a single individual.

In some configurations, the viewer further includes a lamp on the front of the housing. Additionally, the method further comprises the step of activating the lamp to provide illumination prior to the step of moving.

In some configurations, the method further includes the step of digitally decoupling the camera with the remote receiver after the step of locking.

In another aspect of the disclosure, the disclosure is directed to a method of moving and aligning tandem axle lock pins on a semi-trailer comprising the steps of: providing a viewer, the viewer comprising a housing having a front with a camera extending from the front; attaching the viewer to a trailer, so that a rail of the trailer is in the view of the camera, with the rail having openings; digitally coupling the camera with a remote receiver; moving the rail of the trailer relative to the tandem slider frame, the tandem slider frame having openings; aligning an opening of the openings of the rail with an opening of the openings of the tandem slider frame; viewing the camera through the remote receiver during the step of aligning; and locking the rail to the tandem slider frame.

In some configurations, the step of attaching further comprises the step of removably attaching the viewer to a trailer.

In some configurations, a battery is coupled to the camera. The method further includes the step of charging the battery.

In some configurations, the step of digitally coupling further comprises the step of digitally coupling utilizing one of wifi, zigbee and Bluetooth.

In yet another aspect of the disclosure, the disclosure is directed to a system comprising a tractor, a viewer and a remote receiver. The tractor has a trailer coupled thereto. The trailer has a rail and a tandem slider frame movable relative to the rail. The rail has openings and the slider frame has openings alignable with the openings of the rail. The viewer ahs a housing having a camera coupled to circuitry having a computing device. The camera is attached to the trailer in an orientation so as to have at least a plurality of openings of the rail placeable within a view of the camera. The remote receiver is in wireless communication with the computing device. The remote receiver has a screen for viewing the camera, the remote receiver positionable within a cab of the tractor.

In some configurations, the viewer is removably attachable to the trailer.

In some configurations, the remote receiver and the viewer are in wireless communication utilizing wifi.

In some configurations, the viewer is removably attachable to the trailer by way of a magnet coupled to the viewer, with the trailer comprising a ferromagnetic material.

BRIEF DESCRIPTION OF THE DRAWINGS

Figure 2A:
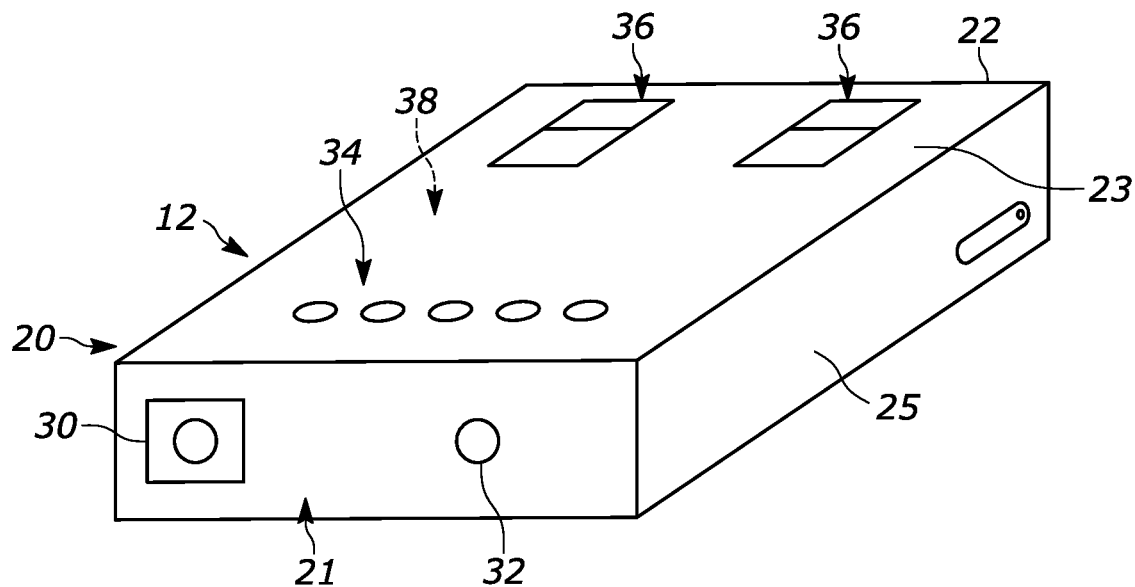
Figure 2B:
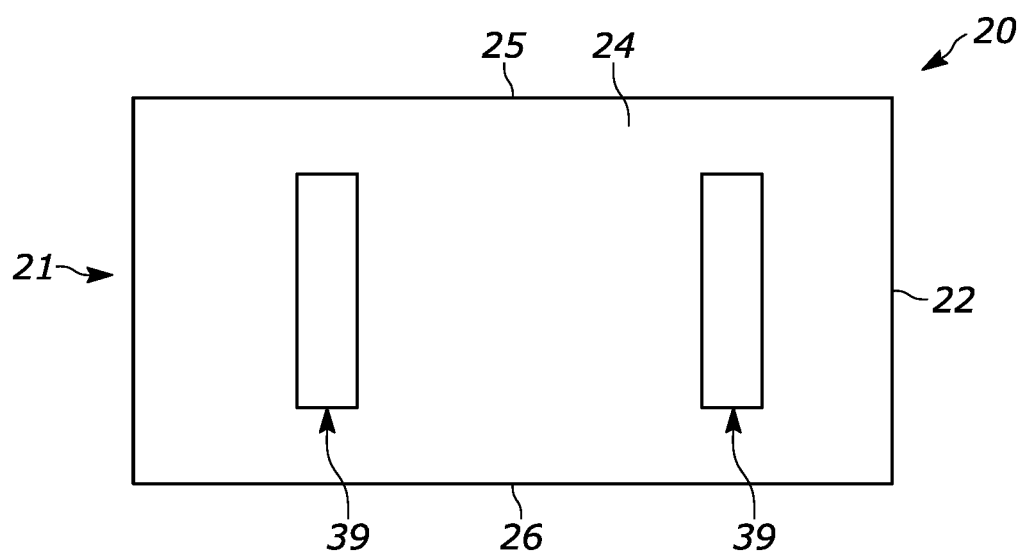
Figure 3:
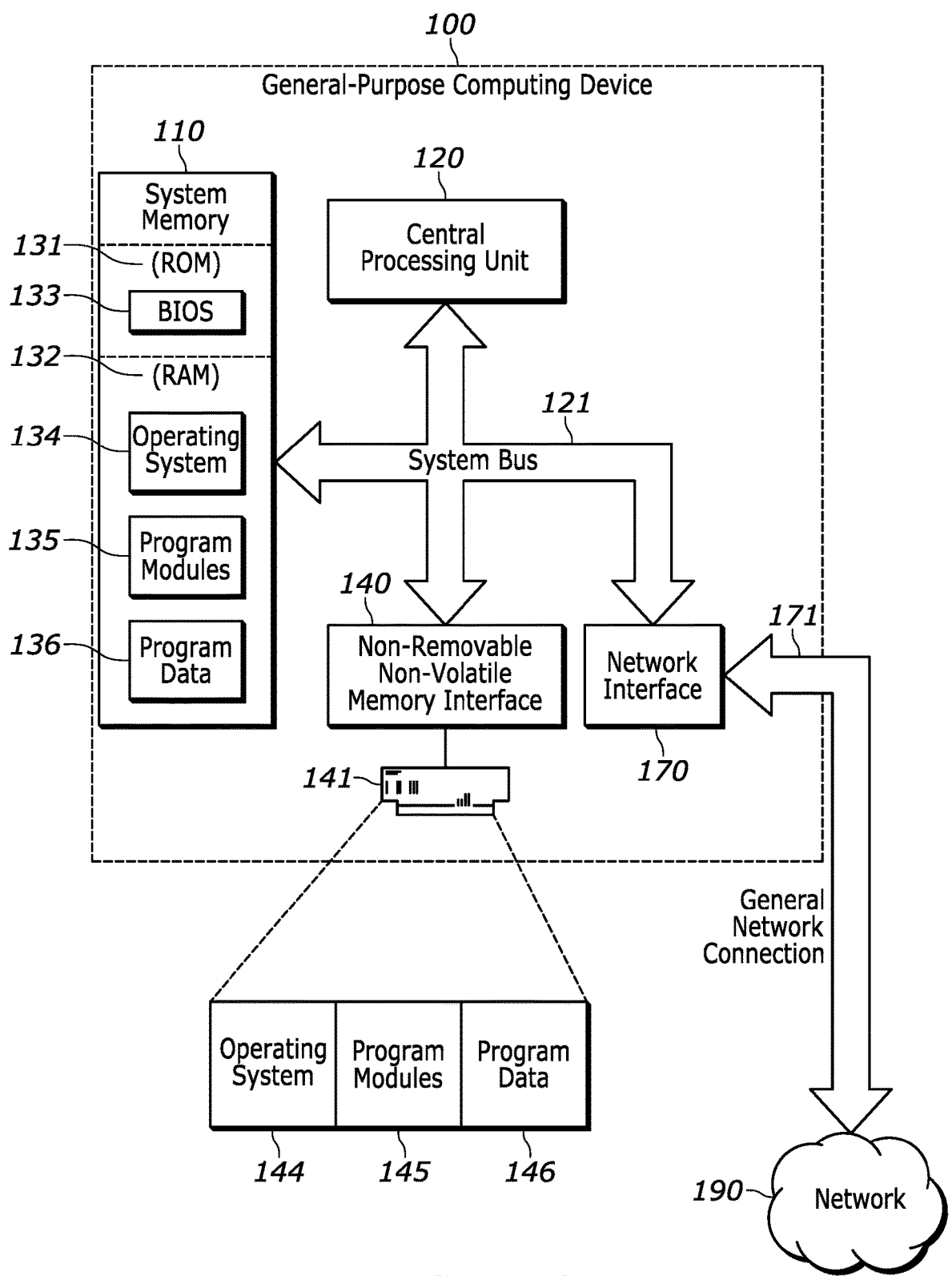

The disclosure will now be described with reference to the drawings wherein:

FIG. 1 of the drawings is a schematic representation of the system for moving and aligning tandem axle lock pins on a semi-trailer of the present disclosure;

FIG. 2a of the drawings is a perspective view of the viewer of the system for moving and aligning tandem axle lock pins on a semi-trailer of the present disclosure;

FIG. 2b of the drawings is a bottom plan view of the viewer of the system for moving and aligning tandem axle lock pins on a semi-trailer of the present disclosure; and FIG. 3 is a schematic representation of a general computing device of the type that can be utilized in association with the viewer.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the system for moving and aligning tandem axle lock pins on a semi-trailer is shown generally at 10. The system is intended for use in association with a trailer, such as trailer 200 having a slide rail 202. The slide rail includes openings 204. A tandem axle slider frame 206 is coupled to the trailer, and includes a frame with openings 208. The frame of the tandem axle slider can slidably move relative to the trailer slide rail 202, and when aligned, pins can be extended through the openings 208 and the openings 204 to couple the two structures to each other. It will be understood that with a plurality of openings in at least one of the structures, the tandem slider frame can be coupled to the trailer is a plurality of positions by slidably moving the structures relative to each other.

The system 10 includes a viewer 12 which can be placed into communication with a remote receiver, such as remote receiver 14. With reference to FIGS. 2a and 2b, The viewer 12 includes housing 20, camera 30, lamp 32, indicators, such as indicators 34, control/input devices 36, attachment member 39, and circuitry 38.

As will be understood the circuitry 38 may comprise a general-purpose computing device (and, for example, it is contemplated that the circuitry may comprise a Raspberry Pi, while certainly not being limited thereto). With reference to FIG. 3, an exemplary general-purpose computing device is illustrated in the form of the exemplary general-purpose computing device 100. The exemplary general-purpose computing device 100 can include, but is not limited to, one or more central processing units (CPUs) 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the general-purpose computing device 100 can be physically co-located, such as on a single chip. In such a case, some or all of the system bus 121 can be nothing more than communicational pathways within a single chip structure and its illustration in FIG. 3 can be nothing more than notational convenience for the purpose of illustration.

The general-purpose computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 100. Computer storage media does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 100 may operate in a networked environment via logical connections to one or more remote computers. The logical connection depicted in FIG. 1 is a general network connection 171 to the network 190, which can be a local area network (LAN), a wide area network (WAN) such as the Internet, or other networks. The computing device 100 is connected to the general network connection 171 through a network interface or adapter 170 that is, in turn, connected to the system bus 121. In a networked environment, program modules depicted relative to the general-purpose computing device 100, or portions or peripherals thereof, may be stored in the memory of one or more other computing devices that are communicatively coupled to the general-purpose computing device 100 through the general network connection 171. It will be appreciated that the network connections shown are exemplary and other means of establishing a communications link between computing devices may be used.

The general-purpose computing device 100 may also include other removable/non-removable, volatile/nonvolatile computer storage media. By way of example only, FIG. 1 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 3, provide storage of computer readable instructions, data structures, program modules and other data for the general-purpose computing device 100. For example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Referring back to FIGS. 2a and 2b the housing 20 includes front 21, back 22, top 23, bottom 24, first side 25 and second side 26. In the configuration shown, the housing comprises a generally rectangular cubic configuration, while other configurations, such as cylindrical, polygonal, varying cross-sectional configurations, among others are likewise contemplated. The camera 30 and the lamp 32 are positioned on front 21 in a generally side by side configuration so that the lamp can be used to provide light while the camera is in operation. The lamp can also be utilized as a flashlight, to, for example, facilitate positioning of the viewer on the trailer. Preferably, the camera has a mega-pixel resolution (such as a 3, 5, 7, 10 or greater mega-pixel resolution) having a focal length of, for example 3 to 4 feet, an automatic focus and an approximately 150 degree viewing angle. The lamp comprises an LED. Of course, the camera and the lamp are not limited to any particular brand, configuration, or type, and the foregoing are meant to be exemplary and non limiting.

The indicator 34 may be positioned on the top 23 and may provide indication as to battery level of the battery within the housing that powers the components, the strength of the wifi, zigbee, Bluetooth or other communication protocol. Additional indicators may be provided, such as, for example to display the intensity of the lamp where the lamp intensity can be changed.

The control/input devices may comprise switches which can toggle, for example, the system off and on, or various components off and on. For example, one switch may toggle the camera and the communication system (wifi) off and on. A second switch may have the function of toggling the lamp on and off so as to allow use thereof as a flashlight. Additional switches may activate, for example, different indicators of the indicators 34, or provide additional functionality. It will be understood that the control/input may further include a charging port in the form of a USB (mini, micro, type A, type B, type C, among others) that can charge the internal battery as well as provide an input device to flash firmware or to adjust parameters, or to provide additional functionality.

The attachment member 39, in the configuration shown comprises multiple magnets that are disposed on the bottom 24 and that extend from the surface so as to directly contact the trailer. In other configurations, the magnets may be embedded, or otherwise shielded and/or covered such that the contact with the trailer is indirect. It is also contemplated that the attachment member may comprise fewer or greater amounts of magnets. Additionally, other structures are likewise contemplated, such as, for example, hook and loop fasteners (wherein one of the hook and loop can be permanently or releasably coupled to the trailer), suction cups, removable adhesives, fasteners such as zip ties, threaded fasteners, among other constructions. While it is contemplated that the device is releasably mounted to the trailer, it is also contemplated that in certain environments, permanent attachment may be desired.

With reference to FIG. 1, the remote receiver 14 is shown as comprising a smartphone, for example, a smartphone operating under the Android operating system or iOS. Of course, other dedicated devices are contemplated for use, however, it is advantageous to utilize a smartphone as most drivers and users own a smartphone and carry a smartphone at all times, and users are typically familiar with the operation of the smartphone, the operating systems, and application installation and use. And, it is contemplated that an application will be available on the smartphone for engaging with and communicating with the viewer.

The operation of the device will be explained with reference to FIG. 1. A user, typically a driver, will first set the viewer into position. In particular, the viewer is positioned at the back of the trailer so that the camera can focus on the openings of the rail and the tandem slider frame. Typically, the trailer frame is of a ferromagnetic material, and the attachment member (magnets, in the configuration disclosed) can be used to couple the viewer to the trailer 200 so that the desired portions of the rail and the tandem slider frame are in focus and within the field of view of the camera. In some configurations, the camera may be magnetically coupled to the underside of the floor of the trailer, for example. Due to the autofocus of the camera, and the relatively wide viewing angle, there is an inherent impreciseness to the particular positioning of the viewer. That is, the viewer will be capable of adequate performance in a number of positions. Thus, the user need not spend too much time perfecting the position of the viewer (i.e., in many instances there is a large acceptable region on the trailer for positioning).

Once the viewer is positioned on the trailer, the user can turn on the viewer through the control/input devices. The user can retract the lock pins to decouple the trailer slide rail from the tandem axle slider frame so that the tandem axle slider frame can slidably move relative to the trailer. Once turned on, the user can also activate the app on the user's smartphone, where the user is guided to connect the smartphone to the viewer. Preferably, the communication is through wifi, due to the distances with which wifi can operate (i.e., 300 feet, for example). Other protocols are contemplated, however, it has been found that many other protocols lack the desired range of wifi, in addition to the relatively low cost of wifi chipsets and functionality, as well as the generally universal inclusion of wifi in smartphone devices.

Once the user has coupled the viewer and the remote receiver in proper data communication, the user can sit in the cab of the tractor (it will be understood that the user could initiated the communication and linking of the devices from the cab or at a distance, or before attaching the viewer to the trailer).

The user can then drive the tractor forward or backward to move the trailer, while the tandem axle slider frame remains stationary. A such, the trailer slides relative to the tandem axle slider frame. In such a manner, the user can align different openings of the trailer slide rail and the tandem axle slider frame. It may be advantageous to place markings with paint, chalk, grease pencil, sticker or other device to aid the user in determining alignment. For example, the user may place a marking on the trailer slide rail and the tandem axle slider frame to indicate the openings that are to be aligned.

Once aligned as desired, the user can exit the tractor cab and extend insert the lock pins into the aligned openings, again locking the trailer slide rail and the tandem axle slider frame to each other. Once aligned, the user can remove the viewer (or leave the viewer if the installation is permanent, or if the user will be travelling only a short distance) and turn the viewer off. If removed, the user can store the viewer in the cab of the tractor for the next use.

It will be understood that there may be additional utility associated with the viewer. Due in part to the concerns arising from Covid-19, it may be advantageous to position the viewer in a position to monitor the loading and unloading of the trailer at a site so that contact with other individuals can be minimized.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A method of moving and aligning tandem axle lock pins on a semi-trailer comprising the steps of:
    providing a viewer, the viewer comprising a housing having a bottom and a front, with a magnet positioned proximate the bottom and a camera extending from the front;
    attaching the magnet of the viewer to a trailer, so that a rail of the trailer is in the view of the camera, with the rail having openings;
    digitally coupling the camera with a remote receiver;
    moving the rail of the trailer relative to the tandem slider frame, the tandem slider frame having openings;
    aligning an opening of the openings of the rail with an opening of the openings of the tandem slider frame;
    viewing the camera through the remote receiver during the step of aligning; and
    locking the rail to the tandem slider frame.

2. The method of claim 1 further comprising the steps of removing the viewer from the trailer.

3. The method of claim 1 wherein the step of digitally coupling further comprises the step of digitally coupling utilizing wifi.

4. The method of claim 1 wherein the step of attaching further comprises the step of attaching the magnet of the viewer to a lower surface of a floor of the trailer.

5. The method of claim 1 further comprising the step of positioning the remote receiver within a cab of a tractor coupled to the trailer during the steps of moving and aligning.

6. The method of claim 5 wherein the remote receiver comprises a smartphone.

7. The method of claim 1 further comprising the step of associating an indicator with at least one of an opening of the openings of the rail, an opening of the openings of the tandem slider frame or a pin associated with at least one of the openings of the rail and the openings of the tandem slider frame.

8. The method of claim 1 further comprising the step of:
    entering a cab of a tractor attachable to the trailer after the step of attaching;
    exiting the cab after the step of aligning; and
    returning to the cab of the tractor after the step of locking.

9. The method of claim 8 wherein the steps of attaching, moving, aligning, viewing and locking are accomplished by a single individual.

10. The method of claim 1 wherein the viewer further includes a lamp on the front of the housing, the method further comprises the step of:
    activating the lamp to provide illumination prior to the step of moving.

11. The method of claim 1 further comprising the step of digitally decoupling the camera with the remote receiver after the step of locking.

12. A method of moving and aligning tandem axle lock pins on a semi-trailer comprising the steps of:
    providing a viewer, the viewer comprising a housing having a front with a camera extending from the front;
    attaching the viewer to a trailer, so that a rail of the trailer is in the view of the camera, with the rail having openings;
    digitally coupling the camera with a remote receiver;
    moving the rail of the trailer relative to the tandem slider frame, the tandem slider frame having openings;
    aligning an opening of the openings of the rail with an opening of the openings of the tandem slider frame;
    viewing the camera through the remote receiver during the step of aligning; and
    locking the rail to the tandem slider frame.

13. The method of claim 12 wherein the step of attaching further comprises the step of removably attaching the viewer to a trailer.

14. The method of claim 12 further comprising a battery coupled to the camera, the method further comprising the step of charging the battery.

15. The method of claim 12 wherein the step of digitally coupling further comprises the step of digitally coupling utilizing one of wifi, zigbee and Bluetooth.

16. A system comprising:
    a tractor having a trailer coupled thereto, the trailer having a rail and a tandem slider frame movable relative to the rail, the rail having openings and the slider frame having openings alignable with the openings of the rail;
    a viewer comprising a housing having a camera coupled to circuitry having a computing device the camera attached to the trailer in an orientation so as to have at least a plurality of openings of the rail placeable within a view of the camera;
    a remote receiver in wireless communication with the computing device, the remote receiver having a screen for viewing the camera, the remote receiver positionable within a cab of the tractor.

17. The system of claim 16 wherein the viewer is removably attachable to the trailer.

18. The system of claim 16 wherein the remote receiver and the viewer are in wireless communication utilizing wifi.

19. The system of claim 16 wherein the viewer is removably attachable to the trailer by way of a magnet coupled to the viewer, with the trailer comprising a ferromagnetic material.

* * * * *